United States Patent [19]

Miller

[11] Patent Number: 4,958,115

[45] Date of Patent: Sep. 18, 1990

[54] CAPACITIVELY COMMUTATED BRUSHLESS DC SERVOMOTORS

[75] Inventor: Gabriel L. Miller, Westfield, N.J.

[73] Assignee: AT&T Bell Laboratories, Murray Hill, N.J.

[21] Appl. No.: 276,751

[22] Filed: Nov. 28, 1988

[51] Int. Cl.$^5$ .......................................... H02K 41/00
[52] U.S. Cl. .................... 318/662; 318/687; 318/135; 310/12; 310/13; 340/870.37
[58] Field of Search ............... 318/135, 254, 483, 439, 318/444, 138, 662, 685, 687; 310/12-15, 23, 27; 340/870.37

[56] References Cited

U.S. PATENT DOCUMENTS

| | | | |
|---|---|---|---|
| Re. 27,436 | 7/1972 | Sawyer | 346/29 |
| 3,486,096 | 12/1969 | Van Cleave | 318/138 |
| 3,575,650 | 4/1971 | Fengler | 318/135 |
| 3,668,443 | 6/1972 | Schwartz | 318/135 X |
| 3,760,392 | 9/1973 | Stich | 340/870.37 |
| 3,836,835 | 9/1974 | Sawyer | 318/687 X |
| 3,845,377 | 10/1974 | Shimotori | 318/662 |
| 3,857,078 | 12/1974 | Sawyer | 318/608 |
| 3,878,411 | 4/1975 | Nocito et al. | 318/135 X |
| 3,938,113 | 2/1976 | Dobson et al. | 340/870.37 |
| 3,961,318 | 6/1976 | Farrand et al. | 340/870.37 |
| 4,303,017 | 12/1981 | Dull | 318/135 X |
| 4,456,934 | 6/1984 | Wedman et al. | 318/662 X |
| 4,507,598 | 3/1985 | Wakabayashi et al. | 318/687 |
| 4,509,001 | 4/1985 | Wakabayashi et al. | 318/687 |
| 4,533,861 | 8/1985 | Rogers | 318/696 |
| 4,543,526 | 9/1985 | Burckhardt et al. | 340/870.37 X |
| 4,618,808 | 10/1986 | Ish-Shalom | 318/696 |
| 4,638,249 | 1/1987 | Tanaka et al. | 340/870.37 X |
| 4,737,699 | 4/1988 | Wen | 318/662 |
| 4,755,731 | 7/1988 | Anthony et al. | 318/662 |
| 4,810,951 | 3/1989 | Meyer | 340/870.37 X |
| 4,841,225 | 6/1989 | Meyer | 340/870.37 |
| 4,843,387 | 6/1989 | Arai et al. | 340/870.37 |

OTHER PUBLICATIONS

"Speed Controls and Servo System", D.C. Motors, Chapter 6, Electro-Craft Corporation, Hopkins, MN (1980).
"Electric Machines and Power Systems", p. 433ff, Prentice Hall, Englewood Cliffs, NJ (1985), by Vincent Del Toro.
"Variable Reluctance Motor Drives for Electric Vehicle Propulsion", vol. II, No. 10, Item 113, JPL Invention Report NOP-169931SC-1444, J. H. Lang and N. L. Chalfin (Dec. 1987).

Primary Examiner—William M. Shoop, Jr.
Assistant Examiner—Paul Ip
Attorney, Agent, or Firm—Geoffery D. Green; W. L. Wisner

[57] ABSTRACT

There are disclosed both one and two-dimensional, high resolution, brushless DC servomotors that are linear, rotary, planar and cylindrical in nature. All of these employ a capacitive method for deriving the required position and motor commutation information. In suitable circumstances, particularly two-dimensional planar motors on air bearings, the method allows the use of the motor ferromagnetic cores themselves as the capacitive position sensing elements. This leads to a particularly simple and compact type of sevomotor design. In addition, since such motors can move at high speed, there are also disclosed two transformer coupled methods for handling the current drive to the motor windings. Both methods are simple, energy efficient, applicable to motors of any number of phases, and in addition, handle motor direction reversals automatically.

36 Claims, 13 Drawing Sheets

FIG. 11
FIG. 12
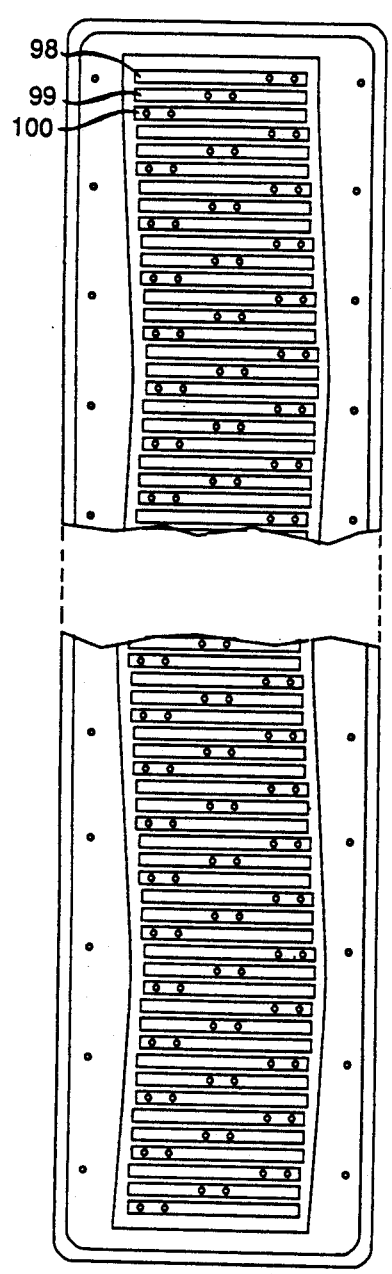
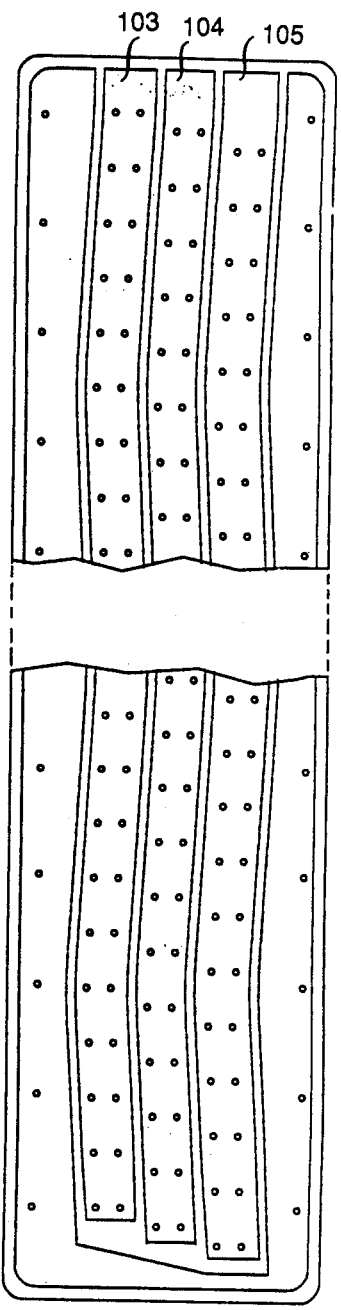

CAPACITIVELY COMMUTATED BRUSHLESS DC SERVOMOTORS

FIELD OF THE INVENTION

This invention relates to efficient brushless DC servomotors that are capable of precise motion in both one and two dimensions thereby forming linear, rotary, planar and cylindrical actuators.

BACKGROUND OF THE INVENTION

In the field of electric motors it is well known that brushless designs are advantageous (See the book, D.C. Motors, *Speed Controls and Servo Systems*, Chapter 6, Electro-Craft Corporation, Hopkins, MN (1980). Such motors typically employ Hall effect magnetic sensors, together with permanent magnets suitably attached to the motor shaft, to provide commutation information for the motor windings. These widely used one dimensional rotary motor designs have also been extended to one dimensional linear applications using either magnetic or optical position sensors, as shown in U.S. Pat. No. 4,509,001 to N. Wakabayashi et al (April 2, 1985) or in U.S. Pat. No. 4,618,808 to J. Ish-Shalom (October 21, 1986). In all such cases the position sensor is an additional element, rigidly attached to the motor itself and accurately positioned with respect to the motor armature. It must be particularly noted in addition that no brushless DC motor in the prior art can move freely through arbitrarily large distances in more that one dimension.

On the other hand there exists a different class of motor, namely stepping motors (See the book by Vincent Del Toro, *Electric Machines and Power Systems*, p. 433ff, Prentice Hall, Englewood Cliffs, N.J. (1985). Such motors are open-loop devices in which the motor position advances incrementally in step with sequential electrical driving signals. Motors of this type have been extended to provide full two dimensional motion on planar surfaces over arbitrary distances, as shown in U.S. Pat. No. Re. 27,436 to B. A. Sawyer (July 18, 1972). Some efforts have also been made to produce a true two-dimensional brushless DC motor from such stepping motors by attempting to measure the motor position magnetically (but now in two dimensions) and again using this information to commutate the motor windings. However such schemes to date have turned out to be both difficult to implement and complex (U.S. Pat. No. 3,857,078 to B. A. Sawyer (Dec. 24, 1974)) and no commercally viable motor of this type has yet been reported. One of the key difficulties in such attempts is that of determining the two dimensional commutation (position) information rapidly and accurately and in such a way that motion in one direction does not disturb the position information available in the perpendicular direction.

There does, however, exist a different scheme for position determination in two dimensions which turns out to be well suited to this task. This is by measurement of the capacitance between a suitably designed electrode array and an appropriately patterned two dimensional surface. (See my U.S. Pat. No. 4,893,071, issued on January 9, 1990.)

It is an object of the current invention that this capacitive position-sensing scheme be applied to both one and two dimensional actuators.

A further inherent problem that arises in variable reluctance motors using unidirectional driving currents is that of dissipating the stored magnetic energy that is present in each winding at the turn-off instant. This problem is exacerbated if the motor uses a fine magnetic pitch and moves at high speed, thereby necessitating rapid inductor switching action.

While energy-recovery schemes for variable reluctance motors exist, some of the prior approaches require separate multiple windings on the motor armature to achieve the intended result. See, for example, "Variable Reluctance Motors for Electric Vechicles," NASA TECH. BRIEF, Vol. II, No. 10, Item 113, JPL Invention Report NOP-16993ISC-1444, J. H. Lang and N. L. Chalfin (Dec., 1987.) The separate motor windings impair other qualities of the motor.

A subsidiary objective of the current invention to arrange for both a speed up of the turn-off process and a corresponding speed up of the turn-on process in the next motor winding, further to arrange that the collapsing magnetic field in one motor winding uses the back-emf thereby generated to temporarily increase the voltage available to the next motor winding to be switched on, and furthermore, to achieve all the foregoing without extra motor windings and to apply all of the foregoing to reversible three phase motors, unlike those of U.S. Pat. No. 3,486,096 to G. W. Van Cleave (Dec,. 23, 1969) and U.S. Pat. No. 4,533,861 to J. E. Rogers, et al (Aug. 6, 1985), existing in the prior art that are also intended to provide rapid magnetic field switching in stepping motors by use of the back emf effect. These latter two prior schemes are unable to handle three phase motors including direction reversal.

SUMMARY OF THE INVENTION

Brushless DC motor action is achieved in all implementations of the invention by determining the relative position of the armature and the stator of a motor by RF capacitance measurements and using this information to control the drive to the motor windings. The capacitance measurements either make use of a separate electrode structure, or else, as in a preferred embodiment of the motor, employ the motor ferromagnetic cores themselves as the capacitive sensing elements. This leads to a self-aligned and compact design requiring no extraneous position sensing components.

The use of four such capacitively commutated linear servo motors mounted along the edges of a planar square air bearing supporting plate then gives rise to a true two-dimensional servo motor. This two dimensional servo motor, which can operate in a plane of, for example, a factory assembly work station, can in turn be modified to provide a two-dimensional cylindrical servo motor providing simultaneous and independent rotation and axial translation in the same actuator.

All of these motor structures lend themselves to high speed motion and this poses a known problem in multiphase motor operation described above, namely the difficulty of rapidly and sequentially switching the magnetic fields in the motor windings. This problem is handled in the present case by a novel passive system that either rapidly transfers the energy in a winding being turned off into the next motor winding being turned on or transfers it back into the power supply. This energy transfer scheme works for motors with arbitrary numbers of phases and furthermore automatically handles motor direction reversals.

This feature more specifically employs a novel diode-coupled autotransformer scheme. This allows a rapid turn-off of each inductive winding, coupled with the efficient return of essentially all the available stored magnetic energy to the driving power supply or other storage device during each turn-off transient. Furthermore this transformer system achieves this end without wasting any of the available motor winding space.

The same techniques used in my above-cited copending patent application for avoiding the effects of spurious capacitances can be advantageously used in the motor itself.

These and further features and advantages of the invention will become apparent from the ensuing drawings and detailed description.

BRIEF DESCRIPTION OF THE DRAWINGS

FIG. 11 shows a form of "Chevron" three phase spatially averaging printed circuit capacitive position sensing element.

FIG. 12 shows interconnection on the back of the three phase printed circuit position sensing electrode.

DETAILED DESCRIPTION

Figure 1:
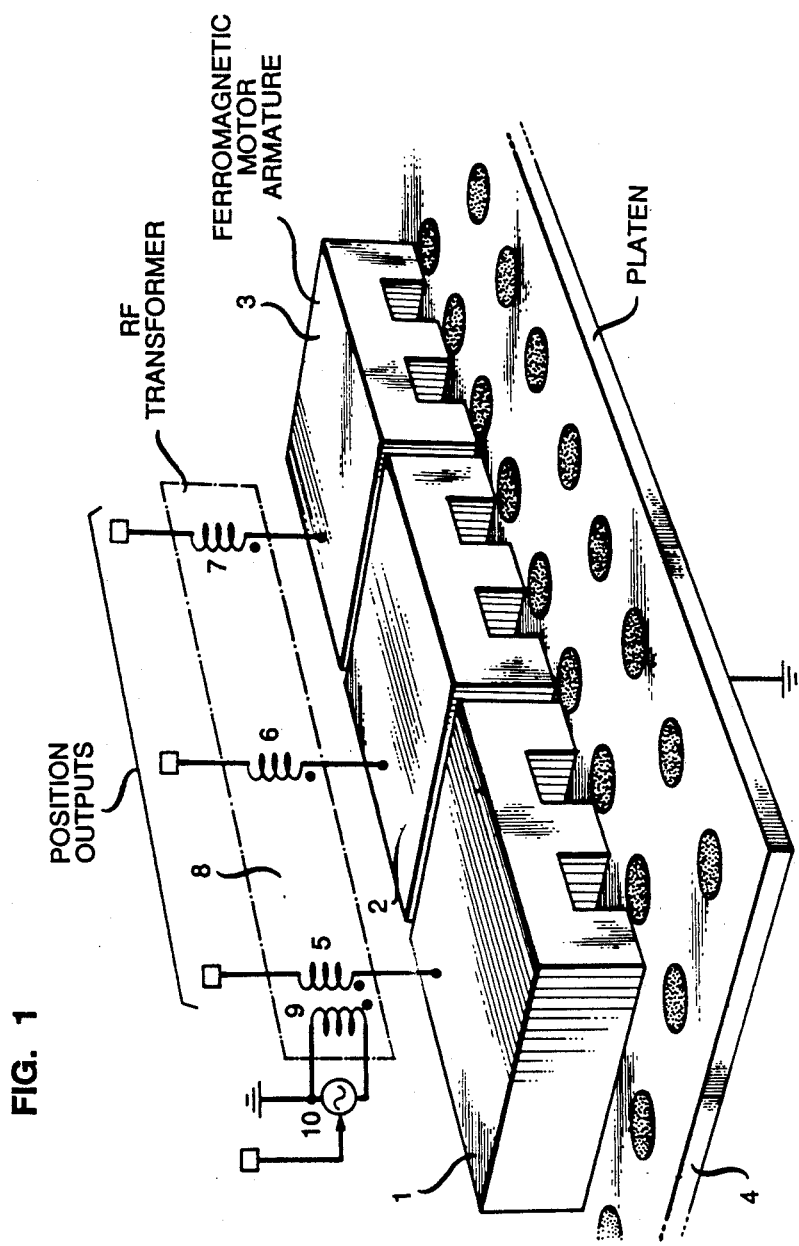
FIG. 1 is a pictorial and schematic showing of a basic scheme of a three phase variable reluctance linear motor which uses the motor armature ferromagnetic cores themselves as capacitive position sensing elements.

The basic form of a preferred embodiment of the invention is shown in FIG. 1.

Figure 8:
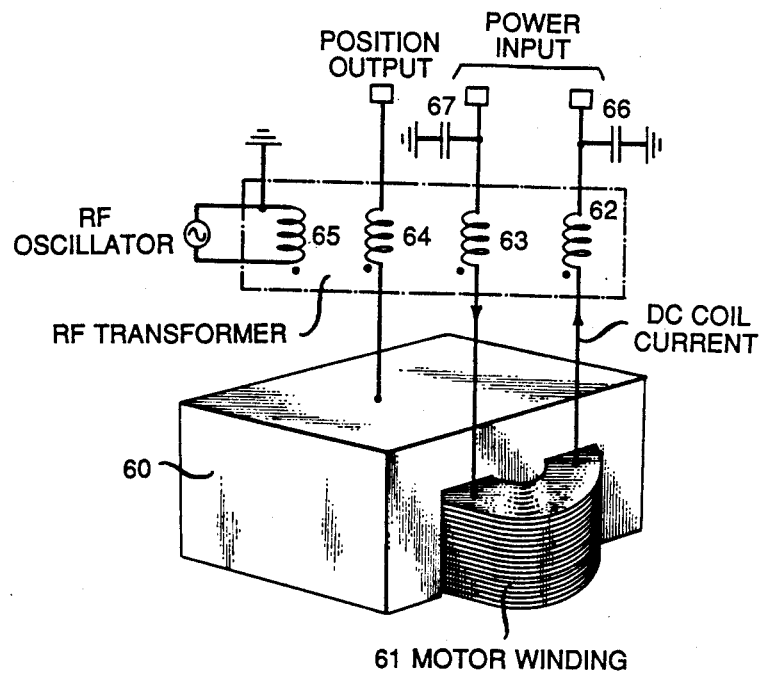
FIG. 8 illustrates the method of removing the effect of the motor winding capacitances from the position-sensing signals.

Here three electrically separate but identical ferromagnetic cores 1, 2, 3 are mounted just above a flat electrically grounded ferromagnetic plate 4 which contains a uniform two dimensional pattern of holes. Each core is connected to a winding 5, 6, 7 on a separate 1:1:1:1 multifilar RF transformer 8 whose primary 9 is driven by an RF oscillator 10. The three cores each contain a winding on their center leg (omitted for clarity, but see FIG. 8) and all three cores are rigidly mechanically attached on one another with particular spacings. This arrangement comprises a variable reluctance linear motor in which the array of ferromagnetic cores (electromagnets) are supported on an air bearing (see FIG. 15) just above the ferromagnetic plate 4 or "platen". Turning on the center leg winding of an appropriate core tends to pull it into step with the nearest "line" of platen material that does not contain holes. Sequentially and appropriately turning the electromagnets on and off in turn then causes the motor to move across the platen. This arrangement of using a ferromagnetic platen with an array of "holes" instead of protuberances or "posts" (which are also usable) has fabrication advantages, allows higher net magnetization, is convenient for air bearings, and provides better position sensing signals.

Figure 2:
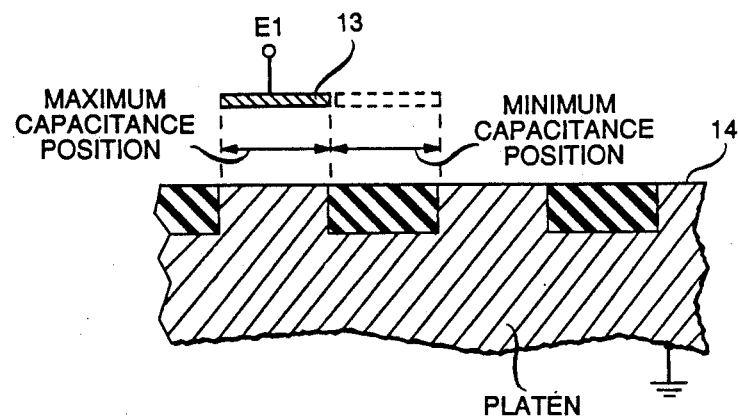
FIG. 2 is a cross-sectional diagram indicating the maximum and minimum capacitance values of an electrode above a patterned ground plane.

Of course the synchronization of the electromagnet current drives is critical since each must be turned on and off at precisely the correct spatial position with respect to the array of platen holes. The way in which the required position sensing is achieved can be understood with the simple diagram of FIG. 2. Here a small conducting electrode 13 is envisaged as being either directly over a conducting region of the platen 14, or else over region with a hole (the holes may or may not be filled with plastic or other dielectric, non-ferromagnetic material). It is evident that the electrical capacitance of the electrode to ground is different in the two cases, with corresponding intermediate values at intermediate positions.

Figure 3:
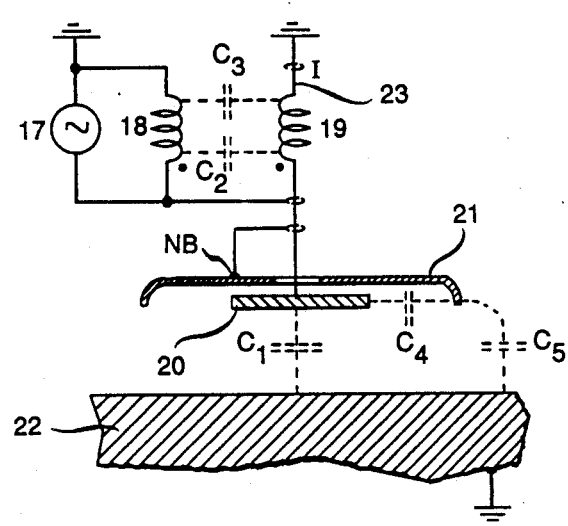
FIG. 3 shows a transformer-coupled self-shielding method of measuring the capacitance of an electrode to ground.
Figure 4:
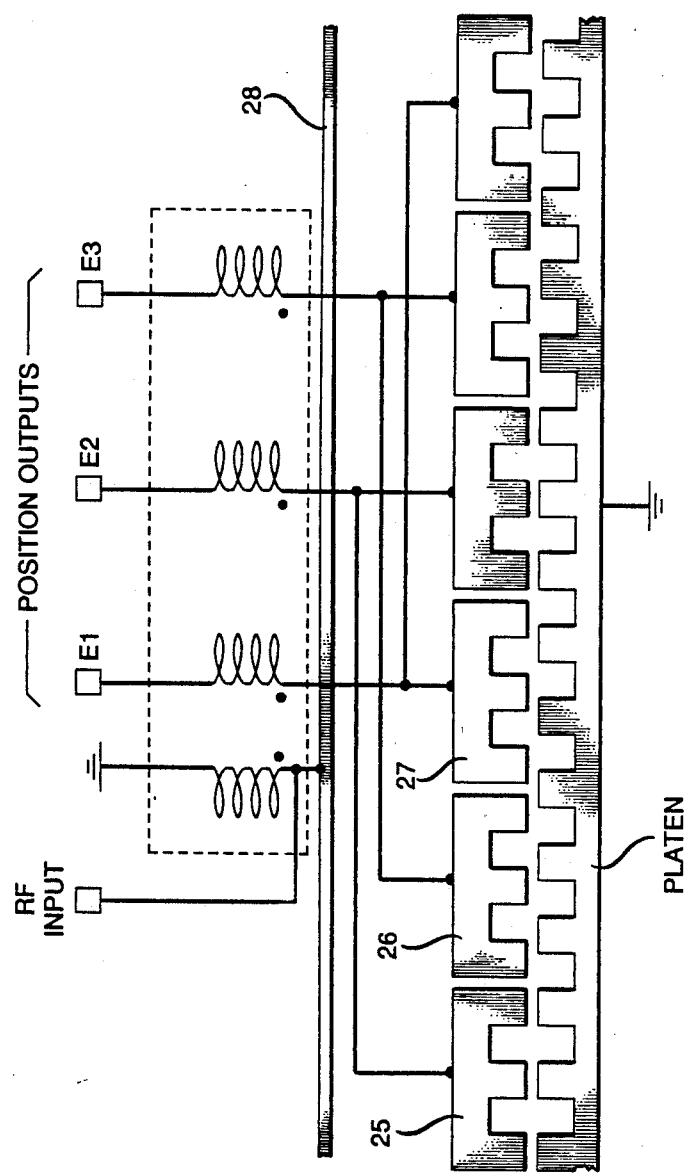
FIG. 4 shows a method of interconnecting a linear array of ferromagnetic motor cores to provide three phase spatially-averaging capacitive position information.

It is this capacitance effect which is used in FIG. 1 to sense the relative position of the ferromagnetic cores with respect to the platen. The way in which this is done, using a multifilar RF transformer, is identical to that described in my previously mentioned co-pending patent application "Interpolating Incremental Capacitive Encoders" Serial No. 197800, filed May 24, 1988. The basic scheme is indicated in FIG. 3. An RF oscillator 17 drives the primary 18 of a bifilar 1:1 transformer. The secondary 19 drives the capacity sensing electrode of interest 20, which is itself advantageously surrounded by a driven guard or shielding electrode 21 driven by winding 18. In this way only the RF displacement current flowing from electrode 20 to ground 22 is measured at point 23. This measurement is independent of all potentially interfering effects of capacitances C2, C3, C4 and C5, as explained in detail in the previously mentioned co-pending patent application. This basic scheme is the one used in FIG. 1 and of course extends directly to the use of multiple sets of cores as shown in FIG. 4. Here cores 25, 26, 27 are connected together with other identical cores in similar relative positions in such a way as to provide a common three-phase output E1, E2, E3. All the electrodes are shielded by a single common guard electrode 28.

Figure 5:
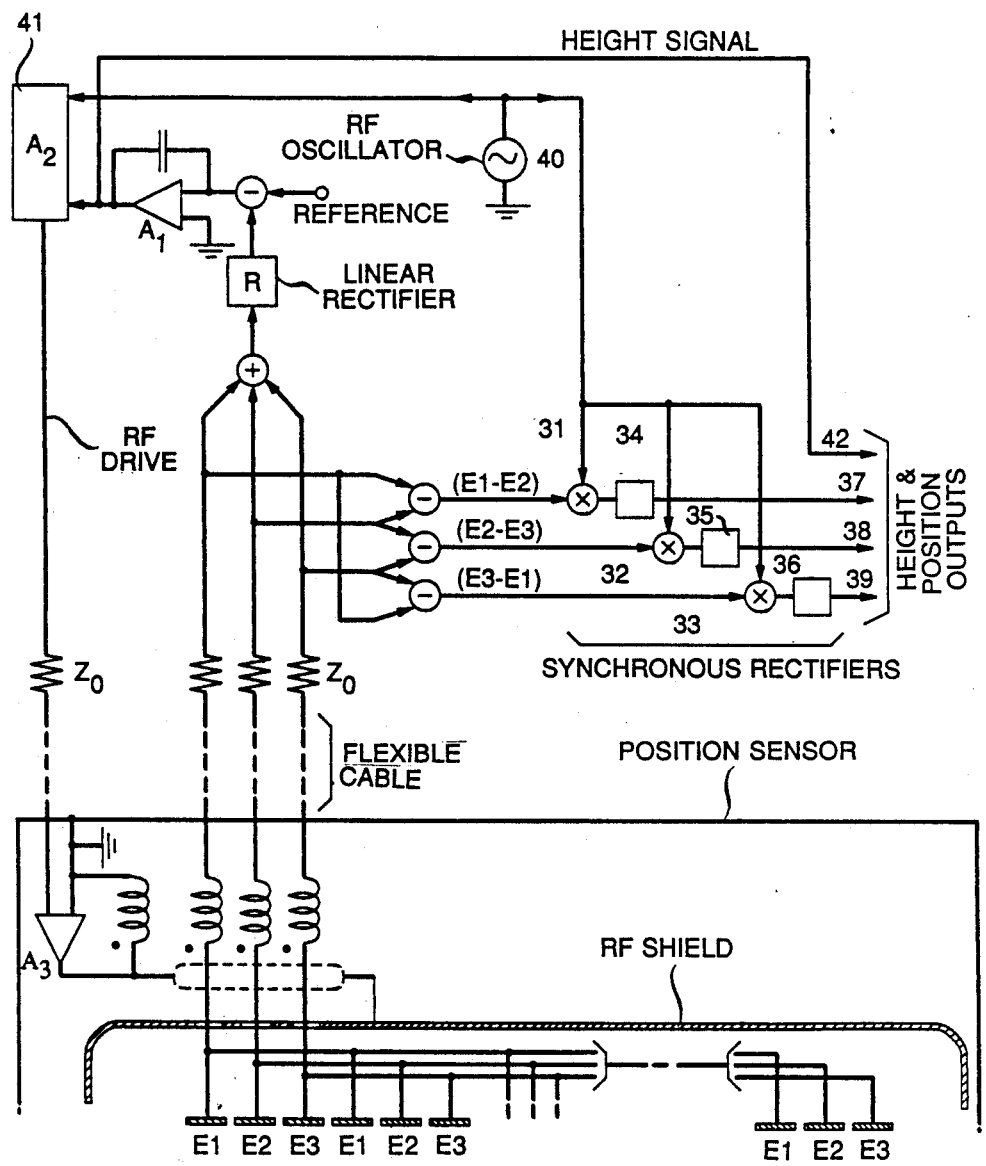
FIG. 5 is an electronic block diagram showing the derivation of the three phase position outputs and height information from the motor electrode capacitances.

The output signals E1, E2, E3 in turn drive the system shown in FIG. 5. This is again identical to that used in the aforementioned co-pending patent application. The differences of the capacitive signals (E1−E2), (E2−E3) and (E3−E1) drive the synchronous rectifiers 31, 32, 33. These then provide the position outputs 37, 38, 39. An RF oscillator 40 drives amplifier A3 through a linear attenuator 41. The total RF amplitude to the E1, E2, E3 electrodes is thereby servoed in such a way as to provide a constant total displacement current. This action provides spacing-independent position signals 37, 38, 39 together with an independent height output signal 42.

Figure 6:
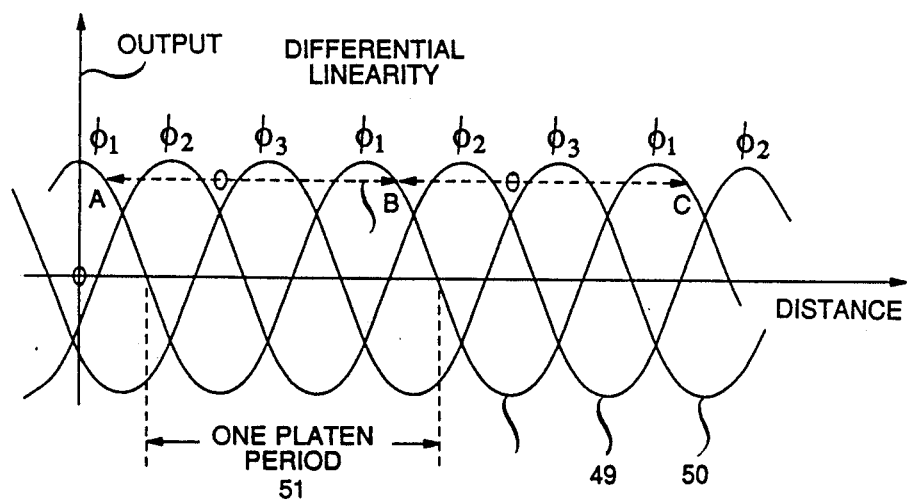
FIG. 6 shows curves of the form of the three phase position output signals $\phi_1$, $\phi_2$ and $\phi_3$ provided by the position sensing system.

The form of the position signals 48, 49, 50, (labeled $\phi_1$, $\phi_2$, and $\phi_3$) is shown in FIG. 6. These are interleaved at 120° (spatial) degrees with respect to one platen period 51. A particular advantage of this capacitance based position measuring system is that it averages over a large area of the platen. This has the effect of ensuring that the system has good differential linearity, i.e., good cycle to cycle reproducibility as the motor moves. This results in corresponding distances such as AB and BC being very nearly equal, which is important for accurate position interpolation.

Figure 7:
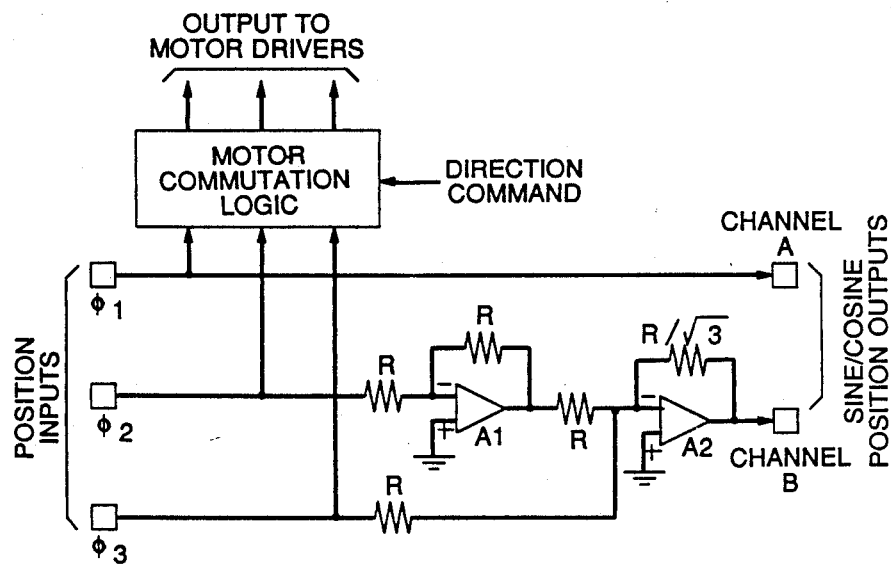
FIG. 7 shows an arrangement for derivation of the Sine/Cosine position outputs from the three phase signals, together with the motor winding commutation commands.

The three-phase position signals $\phi_1$, $\phi_2$, and $\phi_3$ are combined as shown in FIG. 7 to provide Sine and Cosine outputs. These two signals are then used to drive up/down counters to determine the motor position. The same signals are also digitized by an 8 bit ADC to provide fine position interpolation within one platen period. Motor commutation signals are derived from the $\phi_1$, $\phi_2$, and $\phi_3$ position signals. These commutation signals are used in conjunction with the current drivers (which are described subsequently) so as to provide controlled force and direction to the motor motion.

In order to obtain the most accurate position sensing signals it is desirable to reduce to a minimum all stray and unwanted capacitances associated with the motor ferromagnetic cores. One of these stray capacitances is that between the winding on the motor center leg and the core itself. The effect of this stray capacitance is removed by the scheme shown in FIG. 8. Here the electromagnet winding 61 is driven through two additional windings 62 and 63 on the RF transformer. By arranging that the small capacitors 66 and 67 hold one end of each of the transformer windings 62 and 63 at RF ground it follows that the whole of the electromagnet winding 61 itself is driven exactly in unison with the remainder of the ferromagnetic core 60. As a consequence essentially no RF current flows through the stray capacitance between 60 and 61, i.e., effect of this unwanted capacitance has been removed. It will be appreciated that the large DC current that drives the electromagnet coil 61 has no effect on the (ferrite cored) RF transformer 62, 63, 64, 65. This follows since the current through 62 and 63 flows in opposite directions through a bifilar winding and therefore links no net flux with the RF ferrite core.

Figure 9:
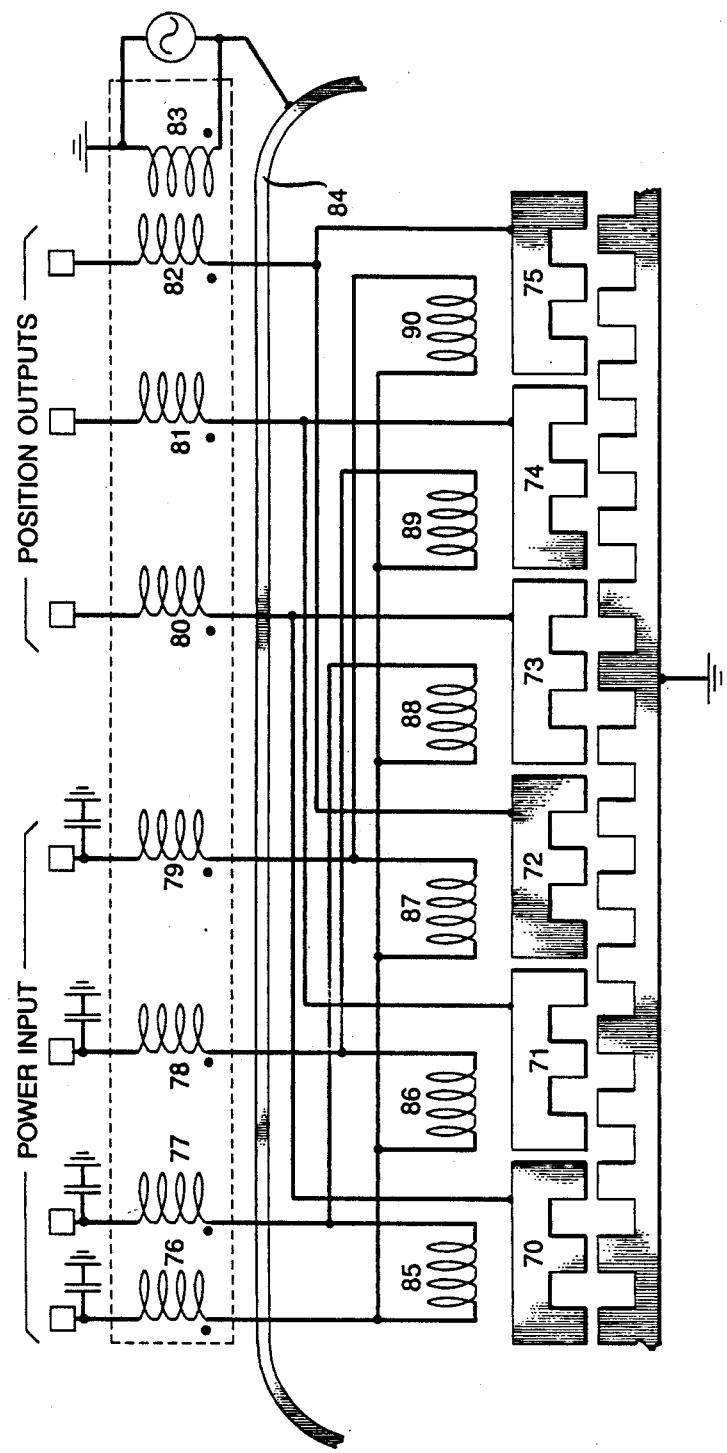
FIG. 9 shows interconnection of multiple motor cores with cancellation of winding-to-core capacitances.

In principle it would be possible to arrange to repeat this procedure for each of the three cores of FIG. 1, for example. However, the same effect can be achieved in all cases, but with fewer windings, as shown in FIG. 9. Here six cores 70 through 75 are shown with their six electromagnet windings 85 through 90. It will be noted that only 8 RF windings (76 through 83) are needed, and indeed only that number is needed for an arbitrarily large number of cores.

Figure 10:
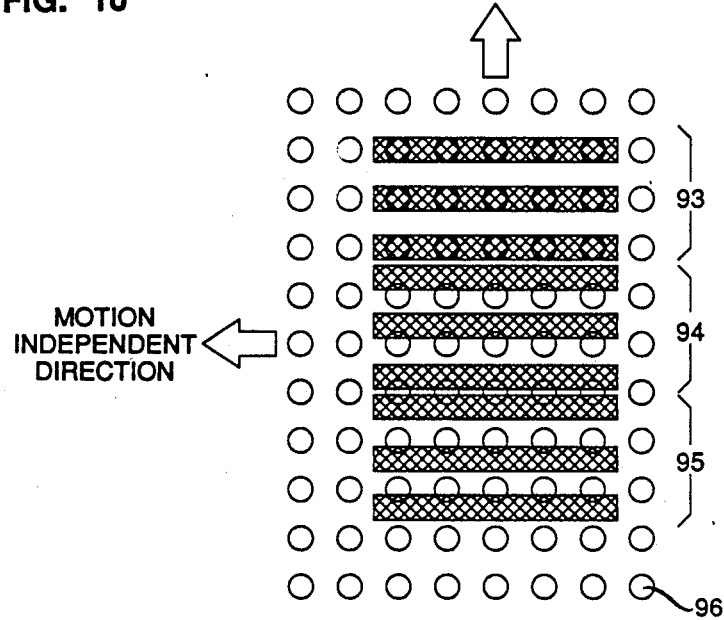
FIG. 10 illustrates the footprint of multiple motor cores to show the transverse motion signal independence.

The footprint of three cores 93, 94, 95 is shown overlaid on the platen array of holes 96 in FIG. 10. It will be noted that since each core has a lateral footprint length, it its motion-independent direction, of exactly an integral number of platen periods, the associated capacitance values remain essentially unchanged for translations in that one (motion independent) direction, while varying essentially sinusoidally (as required) in the other (measuring) direction.

All of the preceding motor description has centered on situations in which the motor armature elements themselves can act as their own capacitive position sensors. In cases where this is not possible a separate capacitive position sensing array can still be used, of the type described in the previously mentioned co-pending patent application. An example is indicated in FIG. 11. This shows a printed circuit array of triples 98, 99, 100 of capacitive sensing elements. These form a slightly meandering "Chevron" pattern that further aids in ensuring that the sensor only reads out for longitudinal motions and not for transverse motions. Each triple of electrodes is interconnected on the back of the printed circuit board (via plated-through holes) to the three common readout lines 103, 104 and 105. Such an electrode structure can be rigidly attached to a suitable set of electromagnets such as cores 70–75 to provide linear motor commutation information. Its advantage over Hall effect or other sensors for this application lies in the fact that it has large area and therefore provides good differential linearity by virtue of providing a high degree of spatial averaging.

Figure 13:
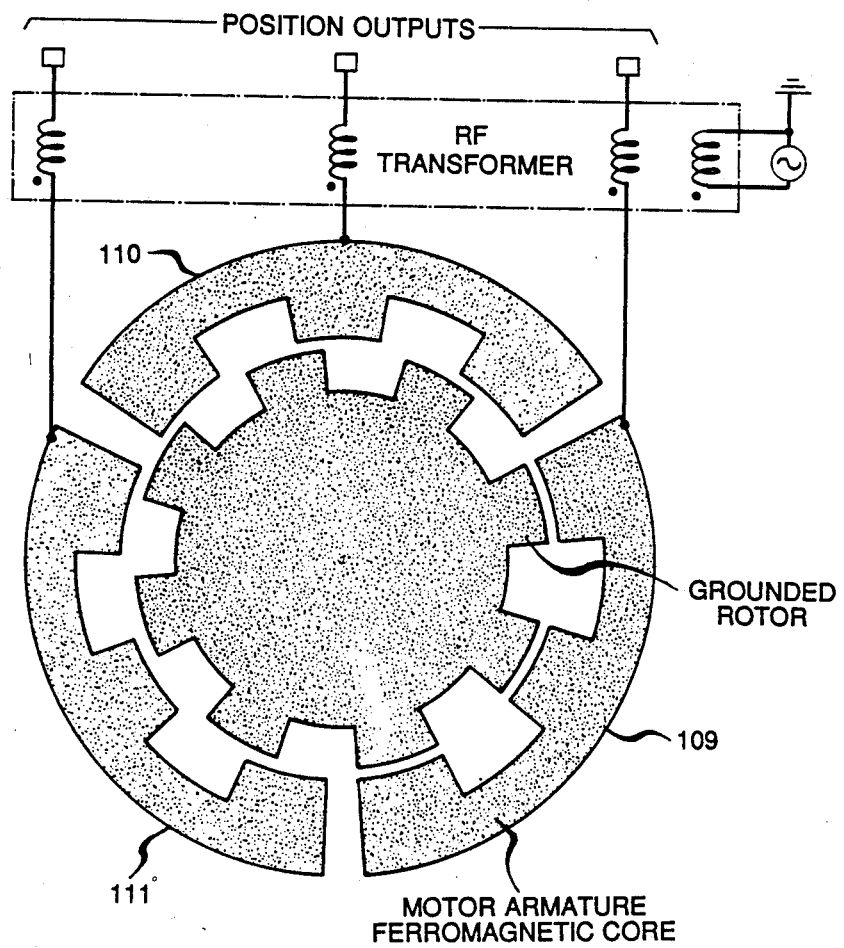
FIG. 13 shows a one dimensional rotary motor using the motor armature ferromagnetic cores as position sensing elements.

Although the previously described systems have all related to one dimensional linear motors, the extension to one dimensional rotary motors is clear. An example in shown in FIG. 13. Here the three armature elements 109, 110, 111 are doubling as their own capacitive position sensing elements in a fashion identical to that of cores 1, 2, 3 of FIG. 1.

Figure 14:
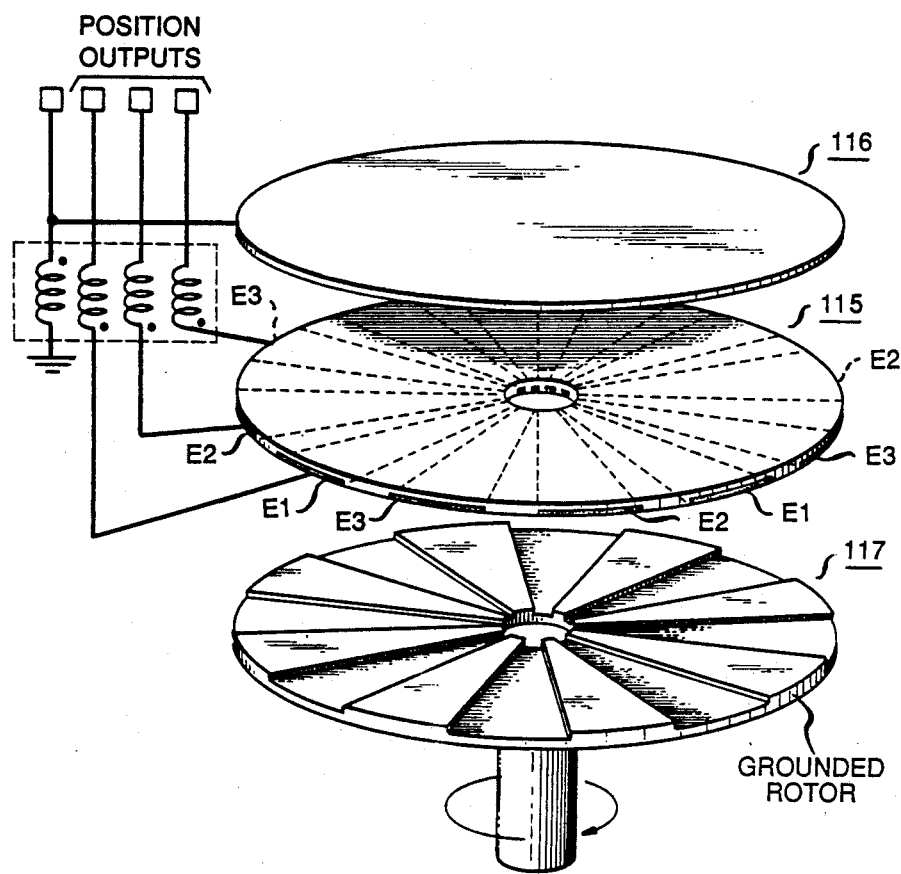
FIG. 14 shows a one dimensional rotary motor utilizing a separate capacitive position sensing element.

Similarly, if the rotary motor armature elements cannot double as their own position sensors it is still possible to provide a separate rotary capacitive sensor. An example is shown in FIG. 14. Here the interleaved triples of sensing electrodes E1, E2, E3 are conveniently formed photolithographically on one side of a piece of printed circuit board 115. The metallization 116 on the other side of the printed circuit board, (shown moved away for clarity), is itself again driven from the RF source as before so that it moves electrically in unison with the electrodes E1, E2, E3, thereby acting as a driven shield. The sensor array is mounted a small distance away from a rotating, grounded, patterned electrode 117 that is rigidly attached to the motor shaft. Although overall this is a flat disc-shaped sensor it will be obvious how to extend it instead to an essentially cylindrical design.

Figure 15:
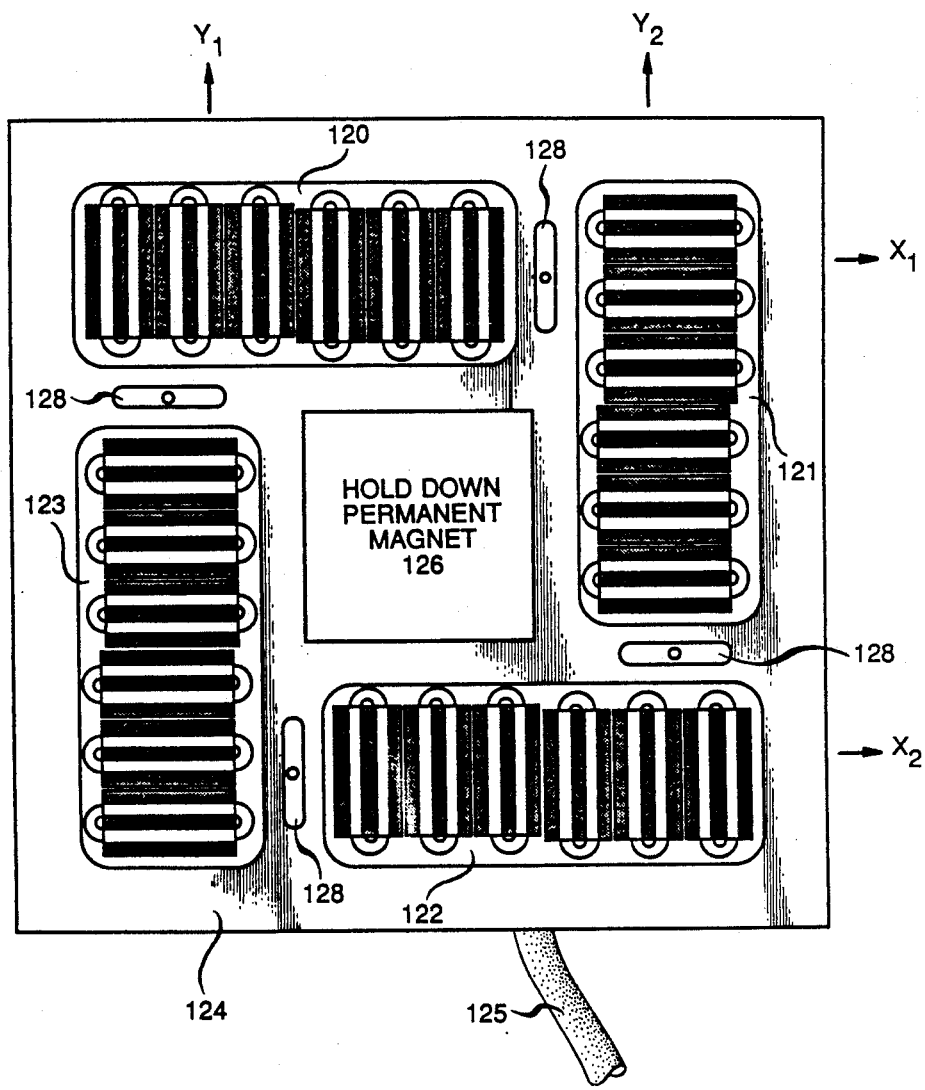
FIG. 15 shows a two dimensional planar servomotor.

From what has been described regarding one dimensional linear capacitively commutated motors of the type shown in FIG. 1 it will be clear that numbers of such motors can be grouped to operate in unison. An examples is shown in FIG. 15 where four such motors 120, 121, 122, 123 lie along the edges of a flat, square, air-bearing plate 124 with air bearing nozzles 128. This design provides for controlled two-dimensional motion over the entire platen area, which can in principle be of indefinite extent. Sensor signals, motor drive signals, power and compressed air (for the air bearing) are provided by a flexible umbilical cord 125. The system provides four separate independent position readout signals $X_1, X_2, Y_1, Y_2$. The position (X,Y) of the center of the motor is defined by $X=\frac{1}{2}(X_1+X_2)$ and $Y=\frac{1}{2}(Y_1+Y_2)$. The angular rotation $\theta$ of the motor (limited to $\pm 5°$ in current designs) is obtained, redundantly, from $(X_1-X_2)$ and $(Y_1-Y_2)$. Motor position, which is needed for closed-loop servo control, is provided by up-down counters driven from the sine-cosine outputs from each motor as indicated in FIG. 7. It will be appreciated that this motor design provides both full two-dimensional planar motion and also controlled rotation over a small (acute) angular range. The commutation signals remain unambiguous for the design of FIG. 15 up to an angle of rotation of about 5°. This angular control can be useful in the application of these motors to assembly operations. The motor position information is redundant, providing the four numbers $X_1$, $X_2$, $Y_1$ and $Y_2$ to specify the three position parameters X, Y and $\theta$. This provides a consistency cross-check. Furthermore, as will be recalled from FIG. 5, the sensor system also provides the heights $h_1, h_2, h_3, h_4$ of each sensor above its local ground plane. This provides a measure at each motor of the air-bearing thickness and this information is again redundant. In this way the four motor sensors provide a redundant readout of all six degrees of freedom of the motor motion. It will be noted also that successive groups of motor cores can have a slight offset from the preceding group for the same motion direction to provide the same effect as the chevron pattern of FIG. 11.

As a practical matter the planar motor uses in addition a permanent hold-down magnet 126 to maintain correct air bearing operation even when all four motors are turned off. This magnet is required because the motors themselves are true variable reluctance designs and therefore do not contain any permanent magnets such as those employed in hybrid stepper motors.

Figure 16:
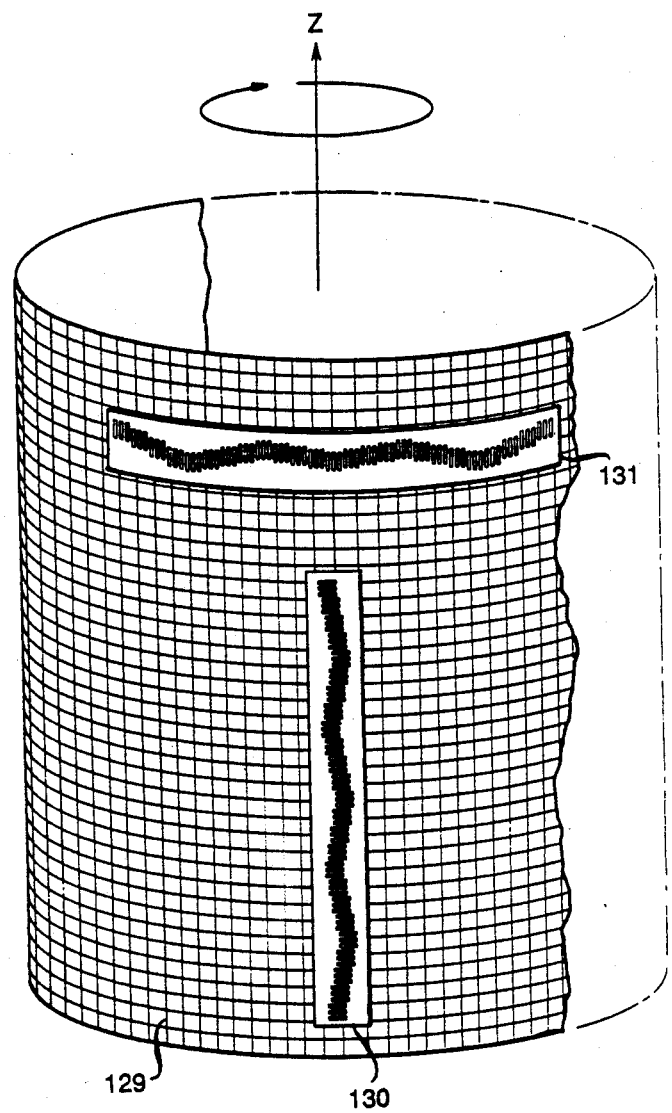
FIG. 16 shows a two dimensional cylindrical servomotor.

Given a two-dimensional planar design of the form of FIG. 15 it is clear that it also, if desired, can instead use four separate capacitive position sensors of the type shown in FIGS. 11 and 12. It is also clear that, independent of which form of sensing is employed, it is possible to convert it to a two-dimensional cylindrical motor of the type shown in FIG. 16. Here the ferromagnetic platen of FIG. 15 has been wrapped around to form a cylinder 129, the surface of which contains, as before, a two-dimensional pattern of either holes or posts. Shown outside and spaced from this cylindrical surface are two separate capacitive sensors 130 and 131, to read out Z and $\theta$, respectively. Equally well, of course, these two sensors can be self-sensing motors of the type of FIG. 1 and FIG. 13 to provide Z and $\theta$ control. In this cylindrical case it is noteworthy that there is no readout redundancy since the cylinder is constrained to allow only Z and $\theta$ motion.

All of the proceeding has related to design and capacitive position sensing of different motors; but nothing has yet been said regarding the actual electrical driving of the motor coils. Typically, for small motors of the kind discussed here, the coil inductances are perhaps $\approx 10$ mh and the maximum drive currents $\approx 2$ amperes The corresponding stored energies are therefore $\approx 2 \times 10^{-2}$ Joules. At high motor speed the switching frequency can be $\approx 1$KHz, thereby leading to coil flyback powers of $\approx 20$ watts. In conventional hybrid motors employing bipolar current drives all of this energy is automatically returned to the driving power supply. In true variable reluctance motors with unidirectional drives (of the kind used here) however, the situation is very different and this energy is often intentionally dissipated as heat in a resistor, or else dissipated in a high voltage zener diode. The advantage of a zener diode is that it clamps the coil flyback voltage at a high and constant value (much higher than that of the driving power supply) which causes the coil magnetic field to collapse very rapidly, which is desirable. However, this is wasteful of energy.

Figure 17:
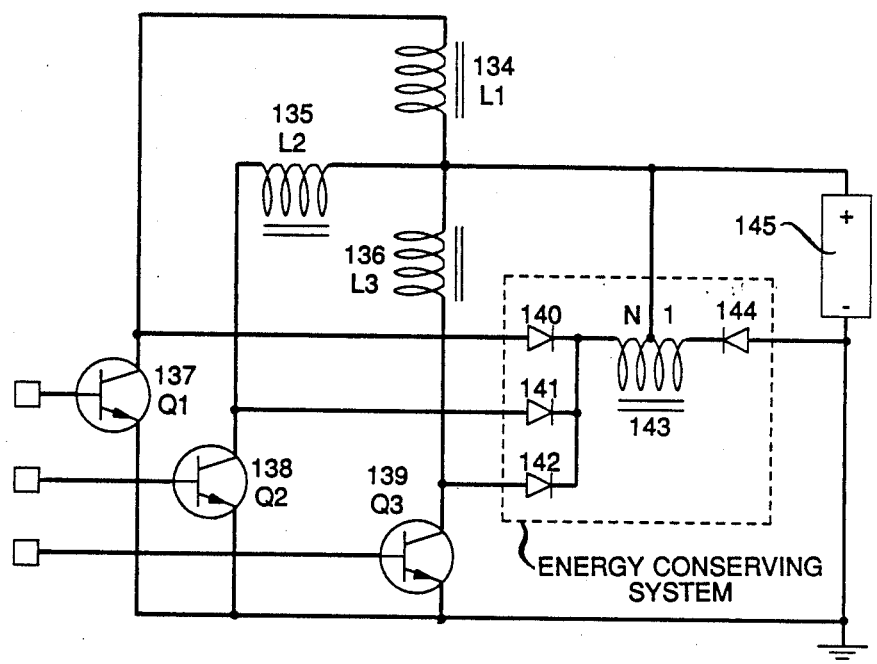
FIG. 17 is a schematic diagram of an energy conserving high speed motor winding turn-off system.

A simple scheme that retains the advantage of rapid field collapse, while in addition wasting essentially none of the available flyback energy, is shown in FIG. 17. Here the three motor coils 134, 135, 136 are star-connected and driven by three power transistors 137, 138, 139. Supposing for example that 137 had been on and is suddenly turned off, then the flyback voltage from inductor 134 rises rapidly until diode 140 turns on. Since the autotransformer 143 has an N:1 step down ratio the clamping voltage seen by inductor 134 is essentially N times that of the power supply 145. This is because the voltage clamping action itself is caused by diode 144 turning on as its cathode is driven one diode drop below ground potential. This therefore provides very rapid coil turn-off action, while simultaneously returning the stored magnetic energy to the power supply.

This scheme is a convenient, efficient and simple one, which in addition works for any number of motor phases, driven in any commutation sequence. However, it only provides for a rapid and efficient coil turn-off, doing nothing to speed up the corresponding coil turn-on.

The turn-on process itself can be speeded up in suitable cases by intentionally extending a property of the circuit of FIG. 17. This property is that when diode 144 turns on (during coil flyback) positive current flows back into the positive terminal of the power source 145. As a result the output voltage of that supply necessarily undergoes a small positive excursion, of a magnitude proportional to its output impedance. This excursion can instead be intentionally made very large indeed by using the system shown in FIG. 18. Here, as before, if one envisages that transistor 151 had been on (carrying current $I_o$) and was suddenly turned off then the voltage across diode 154 suddenly goes positive, i.e., it turns on. Now, however, due to the 1:1 autotransformer 157 and capacitor 160, as diodes 154, 158 and 159 all turn on the circuit is equivalent to that of a simple parallel resonant LC tank with inductor 148 (of inductance L) directly across capacitor 160 (of capacitance C). In one half of a cycle of this resonant tank all the initially stored energy in inductor 148 is transferred to capacitor 160. After that diodes 154, 158 and 159 all turn off and the voltage available for the turn-on of the next motor coil is then $(V_B + I_o \sqrt{LC})$ This can be much larger than $V_B$ itself and therefore leads to a more rapid build up of the current in the next motor inductor to be switched on.

Figure 18:
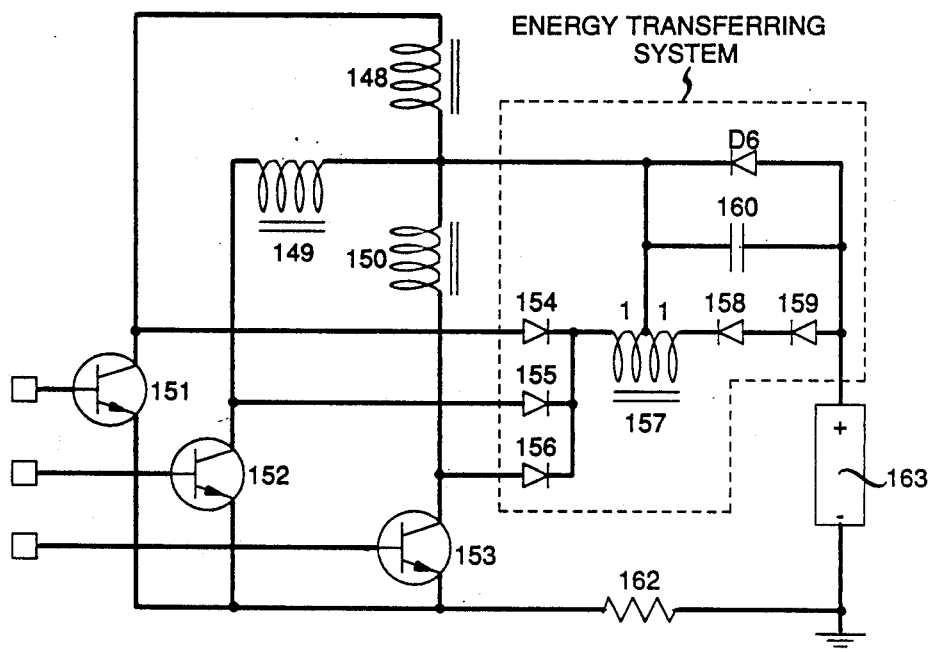
FIG. 18 is a schematic diagram of an energy transferring high speed motor magnetic field switching system.

In practice the situation is more complex that that just described, although the circuit used is precisely as shown in FIG. 18. The commutation cycle employed has only one coil turned on at a time, with exact coincidence of the turn-on and turn-off signals to the power transistors 151, 152 and 153. Theoretically the total field switching time (decay of one coil and build up of the next) is given by $T=0.7\pi\sqrt{LC}$. However, this time is not observed in practice since there are inevitably significant eddy-current and other losses in both the platen and the motor cores. This means that all the magnetic field energy is not automatically transferred from one coil to the next and the difference has to be supplied through diode 161, which takes additional time. However, speedups of a factor of 2 or 3 are obtainable in practical situation.

Two further features of FIG. 18 are noteworthy. First, since only one coil is on at a time, the common resistor 162 provides current feedback information for all the coils and is used in a current servo. Second it is clear that the sequence of the powering of coils 148, 149, 150 is immaterial to the operation of the system. However, this corresponds precisely to reversal of the motor, i.e., motor reversals are handled automatically.

As a final point it should be noted that all of the proceeding has concentrated on three phase motors and the corresponding use of triples of capacitive pickup electrodes. However, it will be obvious to those skilled in the art how to modify the methods presented to handle motors of different designs with different numbers of phases. It should also be apparent that one can produce the desired sinusoidal signals in the measurement direction with a number of different periods and phase offsets of the capacitive elements and/or footprints of electromagnetic cores.

I claim:

1. A motor comprising:
   a plurality of electromagnetic elements defining a first surface and having poles facing said first surface;
   an opposing predominantly ferromagnetic member defining a second surface essentially parallel to said first surface but spatially modulated in one or more directions of intended relative motion between said elements and said member;
   said elements being organized in groups corresponding to a desired number of phases of excitation of the motor, the pole spacing of each of said elements matching a spatial modulation of said member in a first direction, the inter-element spacing of said elements in said first direction being equal to an integral multiple of the period of the spatial modulation in said first direction divided by the number of phases;
   means for establishing multi-phase electromagnetic fields between said member and said elements to provide motive force in the selected direction, including
   means for commutating said multi-phase fields to provide substantial continuity of said motive force;
   said motor being characterized in that
   the commutating means comprises means for sensing capacitive effects related to the relative positions of said member and said elements, and
   means for controlling said multi-phase fields in response to said capacitive effects.

2. The motor according to claim 1, said motor being further characterized in that the sensing means includes means for incrementally determining position of the electromagnetic elements with respect to the spatial modulation of the ferromagnetic member.

3. The motor according to claim 1 said motor being further characterized in that first and second groups of said electromagnetic elements and said ferromagnetic member have the poles or spatial modulation in respective first and second orthogonal selected directions;
the field establishing means is adapted to provide motion in either or both of said selected directions; and
the sensing means comprises means for sensing changing capacitive effects with respect to incremental motion in both of said directions.

4. The motor according to claim 3, said motor being further characterized in that the electromagnetic elements in each of the first and second groups have first and second respective characteristic periods in the first and second respective directions and have respective dimensions in the second and first directions, respectively, equal to an integral number of the second and first characteristic periods, respectively, to render them insensitive to incremental motion in the respective second and first directions.

5. The motor according to claim 1, said motor being further characterized in that first and second groups of said electromagnetic elements are arranged to have first and second characteristic periods in first and second selected directions, respectively;
said opposing ferromagnetic member is spatially modulated in said first and second directions, respectively; said first and second groups of said electromagnetic elements having selected period/phase differences in the respective first and second directions;
said means for establishing multi-phase fields are arranged to provide motive force selectively in said first and second directions respectively; and
the sensing means of the commutating means is arranged in both of said first and second directions for sensing capacitive effects related to the relative positions of said member and the respective first and second groups of said elements.

6. The motor according to claim 1, said motor being further characterized in that the means for establishing multi-phase electromagnetic fields comprises means for establishing multi-phase electromagnetic fields appropriate to a variable reluctance motor.

7. The motor according to claim 1, said motor being further characterized in that the ferromagnetic member comprises a first material and is spatially modulated with respect to the second surface by a regular array of inclusions of a second material, said first and second materials providing a pattern of conducting and non-conducting areas.

8. The motor according to claim 7, said motor being further characterized in that the inclusions of the second material have principal axes essentially orthogonal to a local portion of the second surface.

9. The motor according to claim 7, said motor being further characterized in that the first material is a ferromagnetic conductor and the second material is a dielectric.

10. The motor according to claim 1, said motor being further characterized in that the commutating means comprises
   means for causing each portion of the multi-phase electromagnetic field to rapidly tend to zero near a position that provides minimal motive force, and
   means for extracting a substantial portion of the available field energy from the multi-phase electromagnetic fields at each such position for subsequent resupply to the multi-phase electromagnetic fields.

11. The motor according to claim 10,
said motor being further characterized in that
the extracting means comprises an autotransformer circuit that responds to a current generated by the decay of the field energy to re-direct a substantial portion of the energy nondissipatively.

12. The motor according to claim 11,
said motor being further characterized in that
the extracting means include a power supply and a nonreciprocal circuit interconnected with the autotransformer circuit and the power supply to re-direct the substantial portion of the energy into the power supply.

13. The motor according to claim 12,
said motor being further characterized in that
the extracting means includes a storage capacitor and a nonreciprocal circuit interconnected with the autotransformer circuit and the storage capacitor to re-direct the substantial portion of the energy into the storage capacitor.

14. The motor according to claim 13,
said motor being further characterized in that
the extracting means includes means for causing a discharge of the storage capacitor to speed up the next desired phase of build-up of the multi-phase field 15. The motor according to claim 2,
said motor being further chartacterized in that
said electromagnetic elements and said ferromagnetic member are arranged to have said first surface be essentially planar.

16. The motor according to claim 2,
said motor being further characterized in that
said electromagnetic elements and said ferromagnetic member are arranged to have said first surface be essentially cylindrical and to have the selected direction be different at any moment for different pluralities of said elements but to be always tangent to first first surface.

17. The motor according to claim 1,
said motor being further characterized in that
the sensing means of the commutating means comprises
a multifilar transformer having some windings connected to capacitances between said electromagnetic elements and said ferromagnetic member and having other windings connected to drive capacitances other than the aforesaid capacitances;
and means for exciting said multifilar transformer to drive all of said capacitances in phase to avoid current diversion therebetween 18. The motor according to claim 1,
said motor being further characterized in that
the means for establishing multi-phase fields comprise conductive field windings on at least one of said elements,
said electromagnetic elements and said ferromagnetic member are conductive;
the sensing means of the commutating means comprises
a multifilar transformer having some windings connected to said elements and said member and having at least a pair of windings connected to opposite ends of each of said field windings in bucking orientation to reduce the effective of parasitic capacitances between said field windings and said elements and members, said pair of windings simultaneously reducing the effect of establishment of the multi-phase fields upon the transformer action of the multifilar transformer.

19. The motor according to claim 1,
said motor being further characterized in that
the electromagnetic elements and the ferromagnetic member are electrically conducting; and the sensing means comprises means for sensing capacitive effects between said member and said elements.

20. The motor according to claim 19,
said motor being further characterized in that
the commutating means includes means for combining the sensed capacitive effects, which have differing phases, to interpolate the relative position of said elements and said members in said first direction to within a distance at least an order of magnitude less than the spatial period in said first direction.

21. The motor according to claim 1,
said motor being further characterized in that
the ferromagnetic member has a common spatial modulation in two orthogonal directions of intended relative motion between said elements and said member;
the groups of the electromagnetic elements are organized into at least two similar supergroups each having elements spaced apart in a respective one of said two orthogonal directions;
said elements having dimensions parallel to said first spacing and orthogonal to their supergroup spacing directions, which dimensions are an integral multiple of the spatial modulation period of the ferromagnetic member.

22. A motor of the type claimed in claim 21,
said motor being further characterized in that
the groups of the electromagnetic elements are organized into four of the supergroups, each pair of supergroups of like orientation being mutually separated in an array with the other pair of supergroups;
said motor further including means for providing an air-bearing type of support of the array of supergroups and including magnetic means for tending to limit the air bearing separation;
said array being arranged to tend to control rotation of the array with respect to the intended directions of motion.

23. The motor according to claim 1 or 22,
said motor being further characterized in that
the electromagnetic elements and the ferromagnetic member are arranged to have said first and second surfaces be essentially planar.

24. The motor according to claims 1 or 21,
said motor being further characterized in that
the electromagnetic elements and the ferromagnetic member are arranged to have said first and second surfaces be essentially cylindrical.

25. The motor according to claim 1,
said motor being further characterized in that
the sensing means comprises a plurality of capacitive elements separate from the motive elements.

26. The motor according to claim 19,
said motor being further characterized in that
The ferromagnetic member is spatially modulated by an array of nonconducting, non-ferromagnetic inclusions.

27. The motor according to claim 26, said motor being further characterized in that the inclusions in the ferromagnetic member enable a surface thereof which approximates the second surface to be smooth; and the motor includes air bearing means for maintaining a separation of the elements from said member.

28. The motor according to claim 1,
said motor being characterized in that
the means for establishing multi-phase electromagnetic fields comprising windings on at least a portion of the elements and means for supplying current to said windings to support said fields; and
the commutating means comprises electronic means for interrupting current to a winding supporting a portion of said fields, which portion has magnetic field lines becoming orthogonal to said first and second surfaces; and
means for directing the inductive opposition to the decay of the interrupted current to store energy from the collapsing magnetic field for subsequent re-supply to the multi-phase fields.

29. The motor according to claim 28,
said motor being further characterized in that
the directing means comprises an autotransformer connected to respond to the inductive opposition, and electrical storage means interconnected with the autotransformer to receive energy therefrom.

30. The motor according to claim 29,
said motor being further characterized in that
the electrical storage means is a power supply.

31. The motor according to claim 29,
said motor being further characterized in that
the electrical storage means is a capacitor.

32. The motor according to claim 31,
said motor being further characterized in that
the directing means includes means for causing discharge of the capacitor to accelerate build-up of the next desired phase of the multi-phase field.

33. The motor according to claim 1,
said motor being characterized in that
the sensing means includes a plurality of conducting elements and a spatially modulated common conductive member over which said elements are disposed to form capacitances dependent on the position of said elements with respect to a desired motion, said elements being locally spaced apart with regard to the desired motion and having a pattern of offsets locally orthogonal to said first direction to tend to compensate for variations of said capacitances on account of motion along the alignment of said offsets.

34. The motor according to claim 33,
said motor being further characterized in that
the conducting elements have a pattern of offsets, which pattern approximates a chevron pattern.

35. The motor according to claim 22,
said motor being further characterized in that
the array is arranged to provide unambiguous commutation for a selected acute angle of rotation of the array.

36. The motor according to claim 22,
said motor being further characterized in that
each supergroup of electromagnetic elements includes an arrangement of the groups therein having at least one lateral offset with respect to the intended direction of motion.

* * * * *